US008027447B2

(12) United States Patent
Sylvain

(10) Patent No.: US 8,027,447 B2
(45) Date of Patent: Sep. 27, 2011

(54) CALL PROCESSING BASED ON ELECTRONIC CALENDAR INFORMATION

(75) Inventor: Dany Sylvain, Gatineau (CA)

(73) Assignee: Avaya Inc., Basking Ridge, NJ (US)

( * ) Notice: Subject to any disclaimer, the term of this patent is extended or adjusted under 35 U.S.C. 154(b) by 1152 days.

(21) Appl. No.: 11/554,282

(22) Filed: Oct. 30, 2006

(65) Prior Publication Data

US 2008/0101573 A1 May 1, 2008

(51) Int. Cl.
*H04M 3/42* (2006.01)

(52) U.S. Cl. ......... 379/201.06; 379/201.07; 379/201.08; 379/211.01; 379/211.02; 379/88.18; 379/88.2

(58) Field of Classification Search ............ 379/201.06, 379/201.07, 201.08, 211.01, 211.02, 88.18, 379/88.2
See application file for complete search history.

(56) References Cited

U.S. PATENT DOCUMENTS

| | | | | |
|---|---|---|---|---|
| 5,329,578 A * | 7/1994 | Brennan et al. | ........... | 379/211.03 |
| 5,493,692 A | 2/1996 | Theimer et al. | | |
| 5,544,321 A | 8/1996 | Theimer et al. | | |
| 5,555,291 A * | 9/1996 | Inniss et al. | ........... | 379/88.13 |
| 5,812,865 A | 9/1998 | Theimer et al. | | |
| 5,872,841 A * | 2/1999 | King et al. | ........... | 379/210.01 |
| 5,974,453 A * | 10/1999 | Andersen et al. | ........... | 709/220 |
| 2002/0085701 A1* | 7/2002 | Parsons et al. | ........... | 379/211.01 |
| 2004/0034700 A1* | 2/2004 | Polcyn | ........... | 709/223 |
| 2006/0045255 A1* | 3/2006 | Peters et al. | ........... | 379/265.09 |
| 2007/0047522 A1* | 3/2007 | Jefferson et al. | ........... | 370/352 |
| 2007/0206747 A1* | 9/2007 | Gruchala et al. | ........... | 379/142.01 |
| 2009/0316688 A1 | 12/2009 | Meenavalli | | |

FOREIGN PATENT DOCUMENTS

EP 0608654 A1 8/1994
WO 99/05845 A1 2/1999

OTHER PUBLICATIONS

European Search Report for EP 07021151.1, completed Feb. 7, 2008.
Mahy, R., "A Telephone Number Mapping (ENUM) Service Registration for Internet Calendaring Services," Internet-Draft, http://tools.ietf.org/id/draft-ietf-enum-calendar-service-01.txt, Jun. 22, 2006.

* cited by examiner

*Primary Examiner* — Quynh Nguyen
(74) *Attorney, Agent, or Firm* — Withrow & Terranova, PLLC

(57) ABSTRACT

The present invention allows incoming calls to be processed based on calendar information obtained from an electronic calendar of a called party. When an incoming call intended for the called party is received, a service node may retrieve the calendar information for the called party and process the call based on the calendar information. The call processing may result in forwarding the call or invoking an interactive voice response system (IVR) by forwarding the call to the IVR, and providing instructions based on the calendar information to the IVR. The IVR may then provide messages based on the calendar information to the caller as well as provide options to the caller, retrieve responses from the caller, and instruct the service node to process the call based on the responses. The IVR may also allow the caller to schedule an appointment on the electronic calendar of the called party.

32 Claims, 8 Drawing Sheets

US 8,027,447 B2

CALL PROCESSING BASED ON ELECTRONIC CALENDAR INFORMATION

FIELD OF THE INVENTION

The present invention relates to call processing, and in particular to processing calls based on electronic calendar information.

BACKGROUND OF THE INVENTION

Given the busy schedules for people in modern society, it is often difficult getting in touch with one another. "Phone tag" is commonplace, wherein parties who are trying to call each other end up leaving a series of voicemails until they are lucky enough to connect. In other scenarios, people are interrupted by calls when they are busy working, in a meeting, or on another call.

Many business-based software applications, such as Microsoft® Office Outlook®, allow people on a common network to maintain and share scheduling information via their personal computers. However, such sharing of calendar information is relatively limited and of little assistance when parties are on the go and communicating primarily through their telephones. Given the benefit of having access to another person's calendar information to determine whether the person is available for a telephone call, there is a need to use the calendar information of a called party to assist callers who are attempting to communicate with the called party. There is a further need to allow called parties to provide informative scheduling information to callers in an efficient and effective manner.

SUMMARY OF THE INVENTION

The present invention allows incoming calls to be processed based on calendar information obtained from an electronic calendar of a called party. When an incoming call intended for the called party is received, a service node may retrieve the calendar information for the called party and determine how to process the call based on the calendar information. The call processing may result in forwarding the call to the intended terminal, another terminal, voicemail system, or the like. In addition, the call processing may result in the service node invoking an interactive voice response system (IVR) by connecting the call to the IVR and providing instructions to the IVR based on the calendar information. The IVR may then provide messages to the caller based on the calendar information. The messages may provide information related to the called party's current or future schedule. In addition, the IVR may provide options to the caller, retrieve responses from the caller, and instruct the service node to process the call based on the responses or schedule an appointment on the electronic calendar of the called party.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention allows incoming calls to be processed based on calendar information obtained from an electronic calendar of a called party. When an incoming call intended for the called party is received, a service node may retrieve the calendar information for the called party and determine how to process the call based on the calendar information. The call processing may result in forwarding the call to the intended terminal, another terminal, voicemail system, or the like. In addition, the call processing may result in the service node invoking an interactive voice response system (IVR) by connecting the call to the IVR and providing instructions to the IVR based on the calendar information. The IVR may then provide messages to the caller based on the calendar information. The messages may provide information related to the called party's current or future schedule. In addition, the IVR may provide options to the caller, retrieve responses from the caller, and instruct the service node to process the call based on the responses or schedule an appointment on the electronic calendar of the called party.

Figure 1:
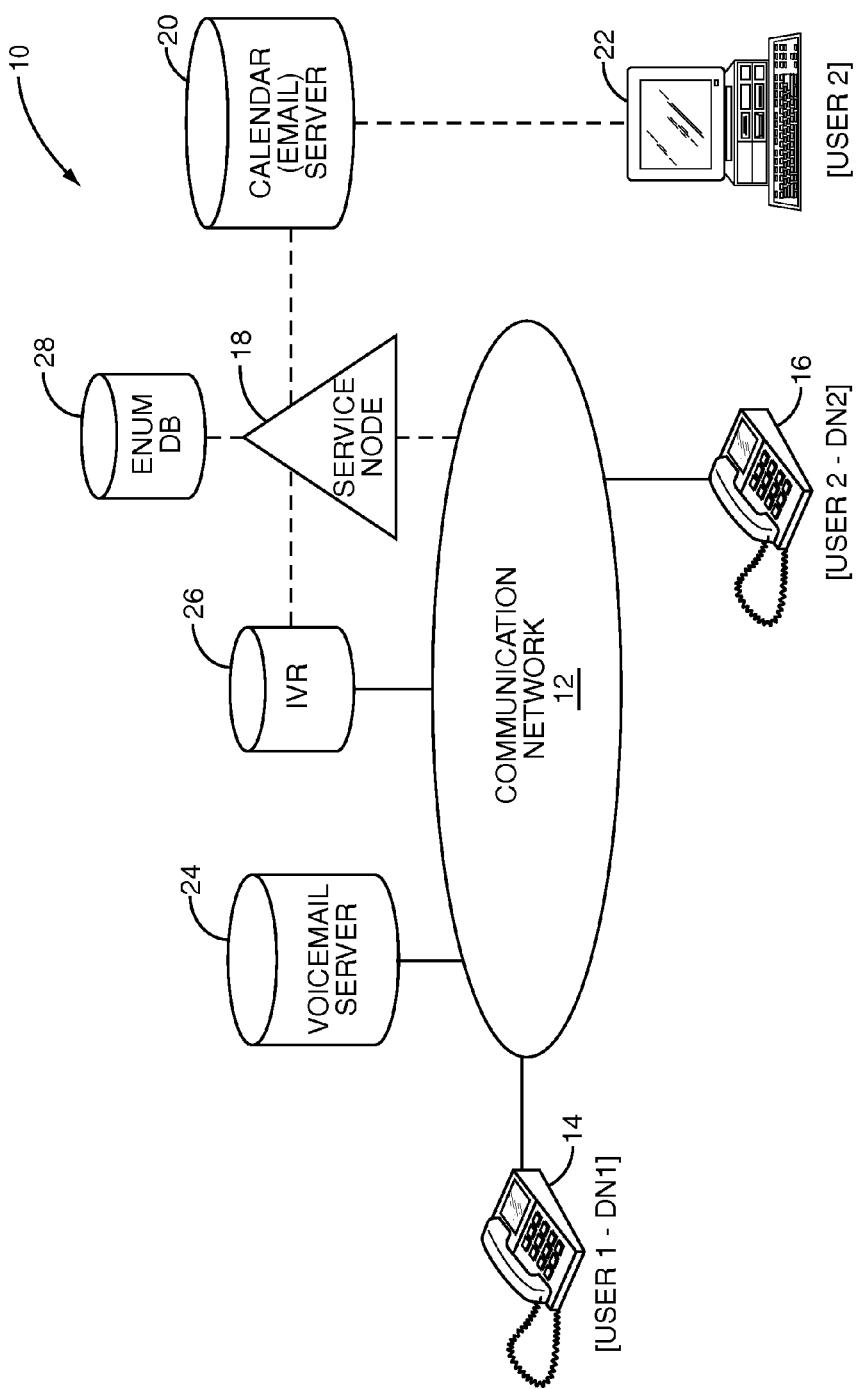
FIG. 1 is a block representation of a communication environment according to one embodiment of the present invention.

Prior to delving into the details of the present invention, an overview of a communication environment 10 in which the present invention may be employed is described in association with FIG. 1. As illustrated, the communication environment 10 is centered about a communication network 12 where a first user terminal 14 is able to initiate a call to a second user terminal 16 with the assistance of a service node 18, which may act as a call server capable of facilitating calls or like communication sessions between various endpoints directly or indirectly coupled to the communication network 12. Assume for the purposes of illustration that the first user terminal 14 is associated with User 1 and has a directory number of DN1. The second user terminal 16 is associated with User 2 and a directory number DN2. The service node 18 also has direct or indirect access to a calendar (email) server 20 through the communication network 12 or like network.

The calendar server 20 is an application server that runs a back office program, such as Microsoft® Exchange®, which supports electronic calendar programs, such as Microsoft® Office Outlook®, on any number of computer terminals. As illustrated, the calendar server 20 supports an electronic calendar running on a computer terminal 22, which is also associated with User 2.

In operation, the calendar server 20 and the computer terminal 22 operate to provide an electronic calendar in which calendar information for User 2 is maintained. The calendar information may include any entries in the electronic calendar, such as appointments, meetings, vacations, or like scheduling information. The calendar information is essentially a calendar entry bearing on the schedule of the corresponding user. In FIG. 1, the electronic calendar for User 2 is maintained by the calendar server 20 alone or in combination with the computer terminal 22. The calendar information for User 2 is accessible by the service node 18 via the calendar server 20. As such, calls intended for User 2 to the second user terminal 16 or other terminal associated with User 2 may be processed in light of the calendar information of User 2. Details relating to such call processing and the interaction with the calendar server 20 to obtain calendar information for User 2 is described further below.

Continuing with FIG. 1, the communication environment 10 may also include a voicemail server 24 to which calls intended for either of the first user terminal 14 or the second user terminal 16 may be routed. The communication environment 10 may also include an IVR 26 as well as an electronic number (ENUM) database (DB) 28. The IVR 26 is an entity that is capable of establishing a call with any type of communication terminal and providing audible messages or tones to the users associated with the communication terminals. The IVR 26 may also be able to recognize voice or dual tone multi-frequency (DTMF) responses from these users and take appropriate action. In the latter case, the IVR 26 may be able to present options to users in an audible format and receive voice or DTMF responses from the users, wherein the information is exchanged within the bearer path for the call. In other words, the interaction between the user and IVR 26 is provided in-band for the call. The IVR 26 and the service node 18 may interact with one another to provide and receive instructions, as will be discussed in greater detail below.

The ENUM DB 28 is a database that is embedded or accessible by the service node 18 and maintains an association between directory numbers or addresses used for communications over the communication network 12 and an address associated with calendar information. As such, the directory number DN2 for User 2 may be associated with a particular calendar address, which finds the location where the electronic calendar on the calendar server 20 is located.

Figure 2:
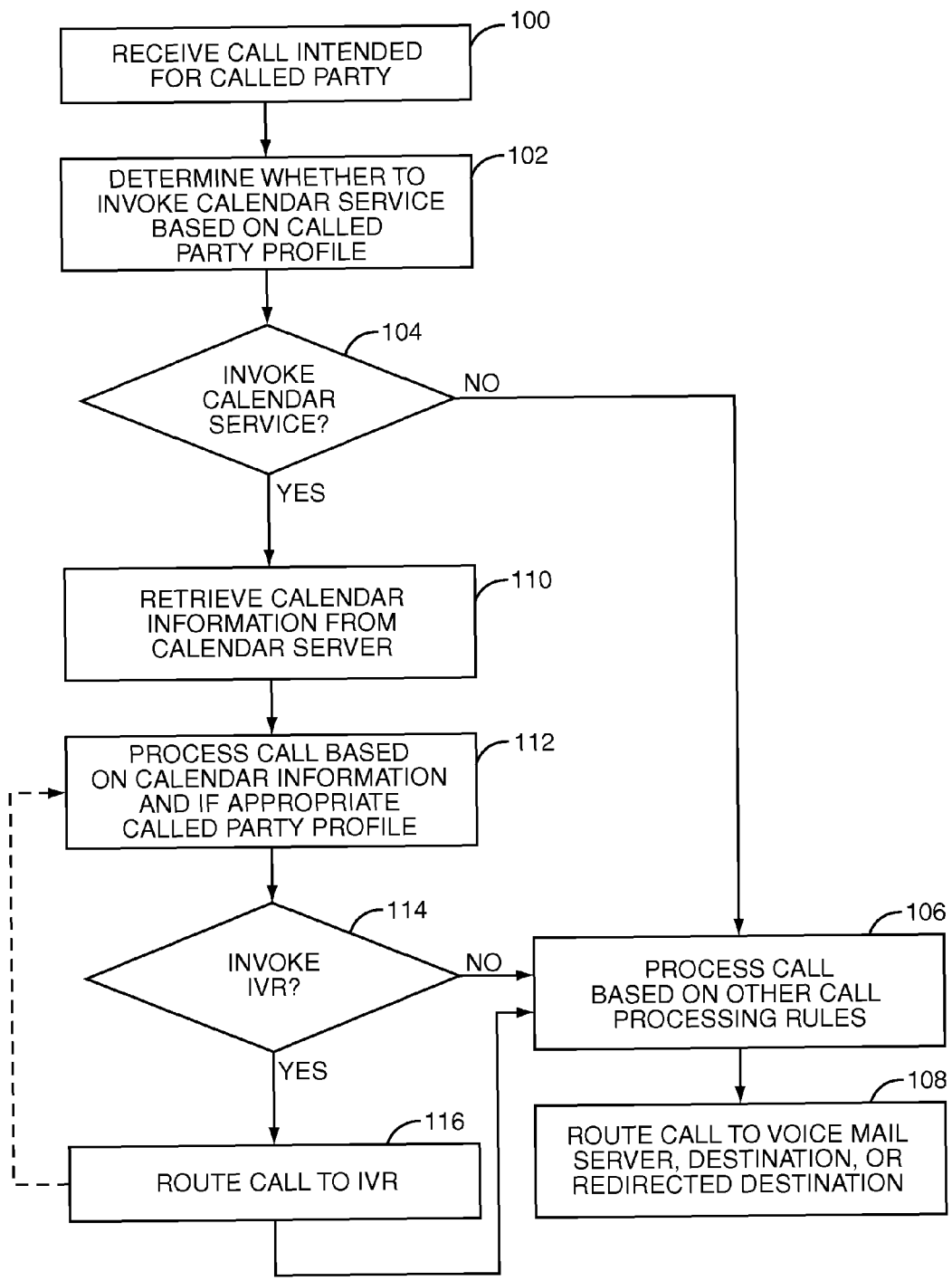
FIG. 2 is a flow diagram illustrating operation of a service node according to one embodiment of the present invention.

Turning now to FIG. 2, operation of the service node 18 is illustrated according to one embodiment of the present invention. When a caller initiates a call to a called party, the call is passed to the service node 18 for call processing. As such, the service node 18 will receive a call intended for the called party (step 100) and determine whether to invoke the calendar service provided by the present invention (step 102). As noted above, the calendar service invokes call processing that is based on calendar information obtained from an electronic calendar of the called party. Invocation of the calendar service may be based on a called party profile, which may define rules setting forth criteria in which the calendar service may be invoked. For example, the calendar service may be invoked when the communication terminal of the called party is busy. Alternatively, the called party profile may define times, dates, callers, or groups of callers in which the calendar service should or should not be invoked.

When the calendar service is not invoked (step 104), the service node 18 may process the call based on other call processing rules, which are not electronic calendar based (step 106) and route the call to the voicemail server 24, the intended destination, or a redirected destination (step 108).

When the calendar service is invoked (step 104), the service node 18 will retrieve calendar information for the called party from the calendar server (step 110) and process the call based on the calendar information for the called party (step 112). The called party profile may also play a role in call processing at this point, as other call processing rules may be triggered based on the calendar information or other call processing rules. The called party profile may provide rules for interpreting the calendar information. These rules may be based on time, date, and caller related information. If any of the calendar information is going to be subsequently presented to the caller, the called party profile may control what information may be provided to the callers, how the information is provided to the callers, and the level of detail to provide to a particular caller or groups of callers. For example, certain callers may be able to obtain information as to the exact calendar entry corresponds to the time in which the call is placed, while others may simply receive a generic message. In essence, the called party profile may control how different calls are processed and how calendar information is handled and delivered in general or based on various criteria, including time, date, and caller.

In one embodiment, the service node 18 may be able to invoke the services of the IVR 26. If the IVR 26 is not invoked (step 114), the call is processed based on the calendar information and then processed based on any other call processing rules that are applicable (step 106). The call is then routed to an appropriate voicemail server, the intended destination, or a redirected destination as dictated by the call processing (step 108).

If the IVR 26 is invoked (step 114), the service node 18 will route the call to the IVR 26, as well as provide instructions based on the calendar information to the IVR 26 (step 116). The IVR 26 is able to terminate the call to the communication terminal from which the call originated and interact with the user associated with the communication terminal in an audible fashion. In a basic embodiment, the IVR 26 is able to provide a message based on the calendar information to the caller. In more sophisticated embodiments, the IVR 26 may be able to provide messages, instructions, or options from which the caller may select to dictate how the call is further processed. As such, the IVR 26 is able to provide audible messages via the call to the caller, as well as receive audible information, such as voice information from the caller or DTMF tones entered by the caller, and respond accordingly. If the IVR 26 receives requests from the caller, these requests may be relayed to the service node 18, which will process the call based on these requests or take other actions, such as interacting with the calendar server 20 to manipulate or obtain information from the electronic calendar of the called party.

Once the IVR 26 has provided its services, the service node 18 may further process the call based on the calendar information of the called party (step 112) or process the call based on any other call processing rules (step 106) and route the call accordingly (step 108).

Figure 3:
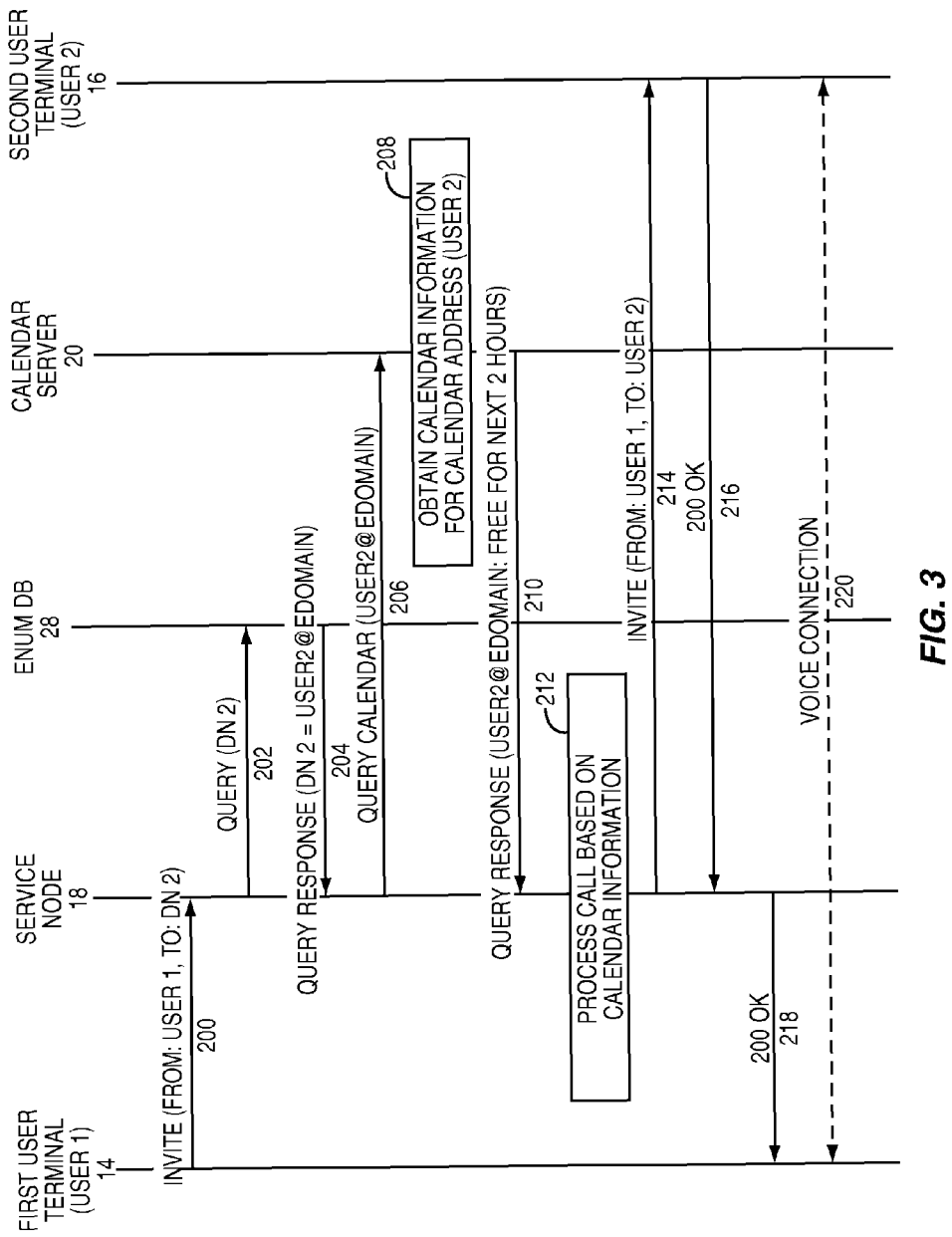
FIG. 3 is a communication flow diagram illustrating a first call processing scenario according to one embodiment of the present invention.

With references to FIGS. 3 through 5, communication flows are provided to illustrate different call processing scenarios where the service node 18 obtains calendar information from the electronic calendar of the called party and processes the call based on the calendar information. In these examples, User 1, who is associated with the first user terminal 14, is the caller. User 2, who is associated with the second user terminal 16, is the called party. The communication flows incorporate the Session Initiation Protocol (SIP) to provide call signaling for a voice-over-packet (VoP) or voice-over-Internet Protocol (VoIP) call over the communication network 12. Those skilled in the art will recognize other communication protocols and communication technologies in which the present invention may be employed.

For the communication flow of FIG. 3, a scenario is presented where User 1 initiates a call to User 2, who is available for the call. The service node 18 will access the ENUM DB 28 to obtain the calendar address for the electronic calendar of User 2 during call processing.

Upon initiation of a call to the second user terminal 16 by User 1, the first user terminal 14 will send directly to the service node 18 or indirectly via other equipment in the communication network 12 an Invite message, which identifies the call as being initiated from User 1 and intended for the directory number DN2 of the second user terminal 16 (step 200). Assuming the service node 18 decides to invoke the calendar service, a query identifying the directory number DN2 is sent to the ENUM DB 28 (step 202), which will obtain the calendar address (user2@edomain) based on the directory number DN2 and provide an appropriate response back to the service node 18 (step 204). The service node 18 may then send a query for calendar information to the calendar server 20 using the calendar address (user2@edomain), which will obtain the calendar information for User 2 based on the calendar address (step 208). The calendar server 20 will then send an appropriate response with the calendar information to the service node 18 (step 210). As illustrated, the calendar information in the case of User 2 is free for the next two hours.

The calendar information retrieved from the electronic calendar may vary from application to application or based on the called party profile or profile of the electronic calendar itself. In one embodiment, the calendar information may relate to any calendar entries corresponding to the time at which the call is received. In addition to the current calendar entry, future calendar entries for a set period of time may be included in the calendar information. The calendar information may include the nature of the calendar entry, as well as the details of the calendar entry. The nature of the calendar entry may relate to generic categories, such as out of the office, vacation, busy, etc., wherein detailed information may include location of the vacation, parties to a conference call or meeting, and the like. Various levels of granularity may be used for processing and using the calendar information.

Upon receipt of the calendar information, the service node 18 will process the call based on the calendar information (step 212). In this example, the service node 18 recognizes that User 2 is available for calls for the next two hours, and as such will allow the call to proceed. The service node 18 will forward the Invite message for the second user terminal 16 to present the call to User 2 (step 214). When User 2 answers the call, the second user terminal 16 will send a 200 OK message toward the service node 18, which will send the 200 OK message toward the first user terminal 14 (step 218). Notably, the SIP messaging exchange between the first user terminal 14 and the second user terminal 16 will include the session data protocol (SDP) which allows the first and second user terminals 14, 16 to exchange their respective communication capabilities and port identifiers to allow a voice connection for the call to be established between the first user terminal 14 and the second user terminal 16 (step 220).

Figure 4A:
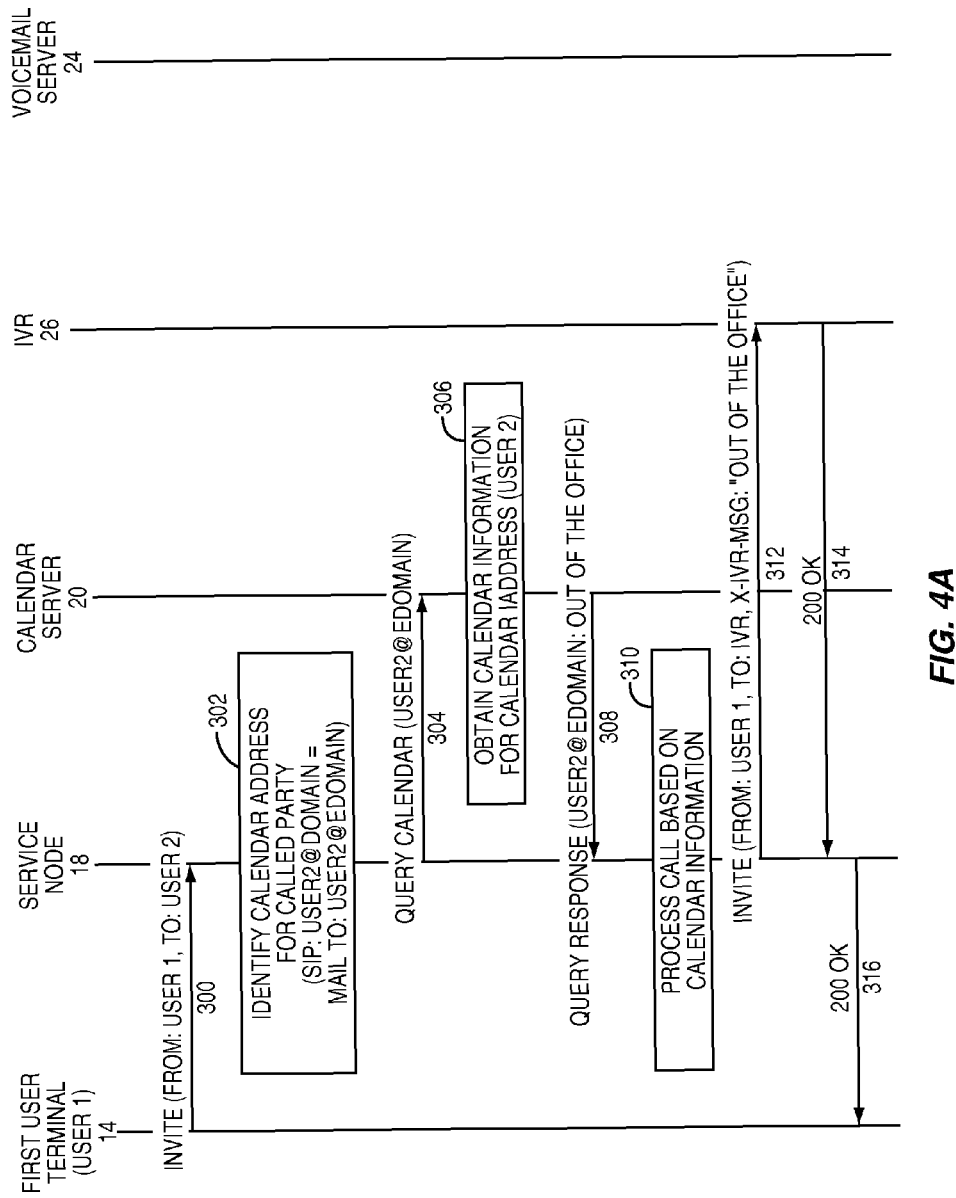
FIGS. 4A and 4B show a communication flow diagram illustrating a second call processing scenario according to one embodiment of the present invention.
Figure 4B:
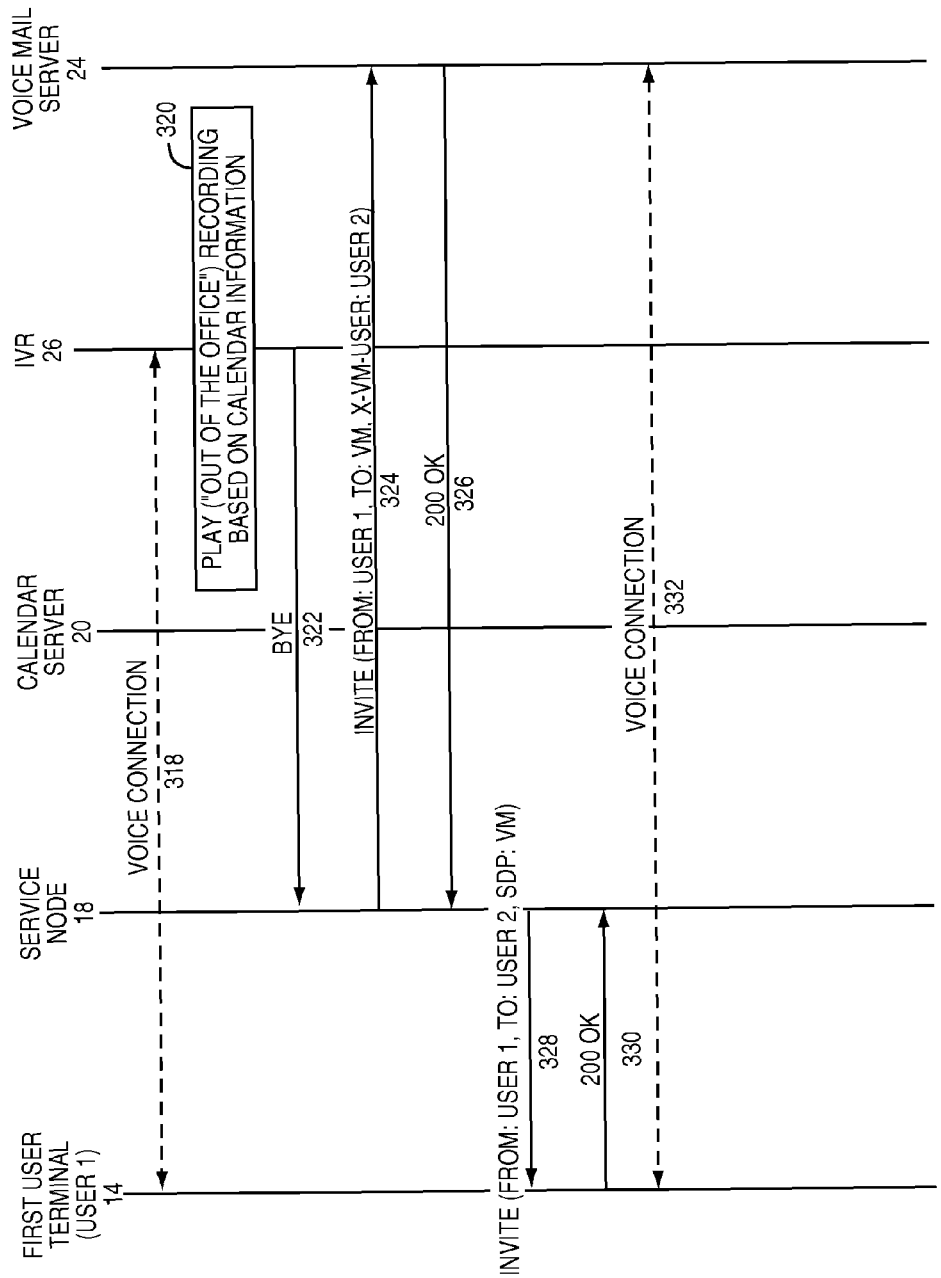

Turning now to FIGS. 4A and 4B, a scenario is provided where the calendar information for User 2 indicates that User 2 is out of the office, and the service node 18 will invoke the IVR 26 to provide an out of office message to the caller prior to routing the call to the voicemail server 24. Again, when User 1 initiates a call to User 2, the first user terminal 14 will send an Invite message to the service node 18 (step 300). The Invite message will indicate that the call is being originated from User 1 and is intended for User 2. As illustrated, an address (USER2) is provided for User 2 instead of the directory number DN2. Those skilled in the art will recognize that calls may be routed toward directory numbers or addresses, and these terms may be used interchangeably. The service node 18 may identify the calendar address for the called party (step 302) and send a query to the calendar server 20 to obtain the calendar information for User 2 (step 304). The calendar server 20 will use the calendar address to obtain the calendar information for User 2 (step 306) and provide the calendar information for User 2 to the service node 18 in an appropriate response (step 308). Upon receiving the calendar information for User 2, the service node 18 will process the call based on the calendar information (step 310).

In this example, the service node 18 will be configured to invoke the IVR 26 when the calendar information indicates that User 2 is out of the office. The service node 18 is further configured to instruct the IVR 26 to terminate the incoming call and provide an audible message indicating that User 2 is out of the office. As such, the service node 18 will send an Invite message to the IVR 26 instead of the second user terminal 16 (step 312). The Invite message will indicate that the call is from User 1 and now redirect it to the IVR 26. The Invite message may also include instructions to provide the out of office message to the caller. This information field in the Invite message may be provided in a SIP message extension or the like, or in a separate message. The IVR 26 will receive the Invite message and provide a 200 OK message back to toward the service node 18 (step 314), which will forward the 200 OK message to the first user terminal 14 (step 316). At this point, a voice connection for the call is established between the first user terminal 14 and the IVR 26 (step 318). Again, the SDP in the SIP message exchange will allow the first user terminal 14 and the IVR 26 to exchange their respective communication capabilities or identifiers to facilitate the voice connection.

Based on the instructions provided by the service node 18, the IVR 26 will play a recording over the voice connection to the caller (step 320). In this example, the audible message played to the caller may be "out of the office" or some variation thereof, such as, "User 2 is out of the office and unavailable at this time." After providing the message to the first user terminal 14, the IVR 26 will send a Bye message back to the service node 18 to indicate that the message has been played and that the voice connection between the first user terminal 14 and IVR 26 has been released (step 322). At this point, the service node 18 will continue call processing based on the calendar information or other call processing rules.

In this example, when the calendar information indicates that the user is out of the office, the call is routed to the voicemail server 24 after the IVR 26 provides the "out of the office" message to the caller. As such, the service node 18 will send an Invite message to the voicemail server 24 to effectively route the call to the voicemail server 24 for User 2 (step 324). The voicemail server 24 will answer the call and provide a 200 OK message back to the service node 18 (step 326). The service node 18 will also send an Invite message to the first user terminal 14 to assist in establishing a connection between the first user terminal 14 and the voicemail server 24 (step 328). The first user terminal 14 will respond with a 200 OK message (step 330), wherein a voice connection is established between the first user terminal 14 and the voicemail server 24 (step 332). Again, the SIP messaging will allow the first user terminal 14 and the voicemail server 24 to exchange the SDP information required for the voice connection. User 1 may then leave a voicemail for User 2 and end the call (not shown).

Figure 5A:
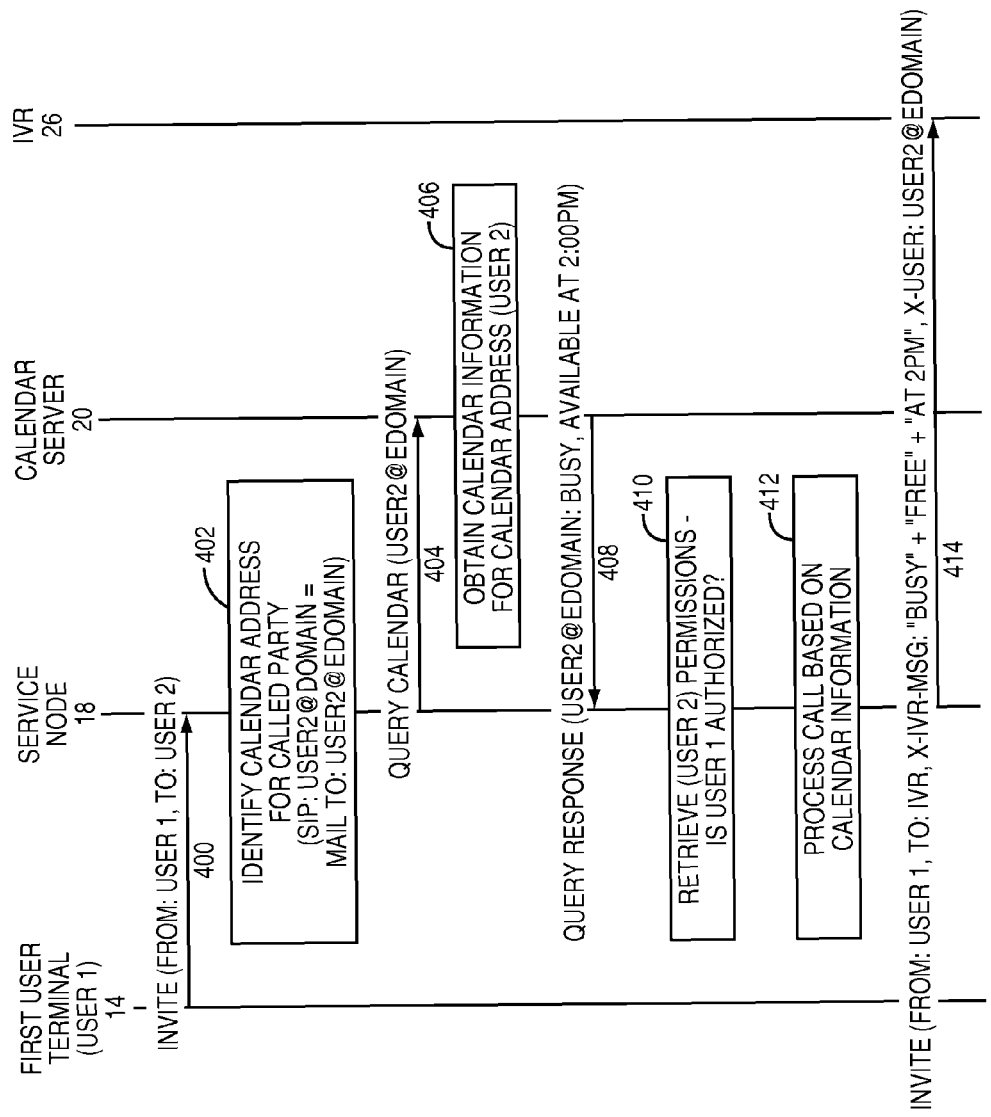
FIGS. 5A and 5B show a communication flow diagram illustrating a third call processing scenario according to one embodiment of the present invention.
Figure 5B:
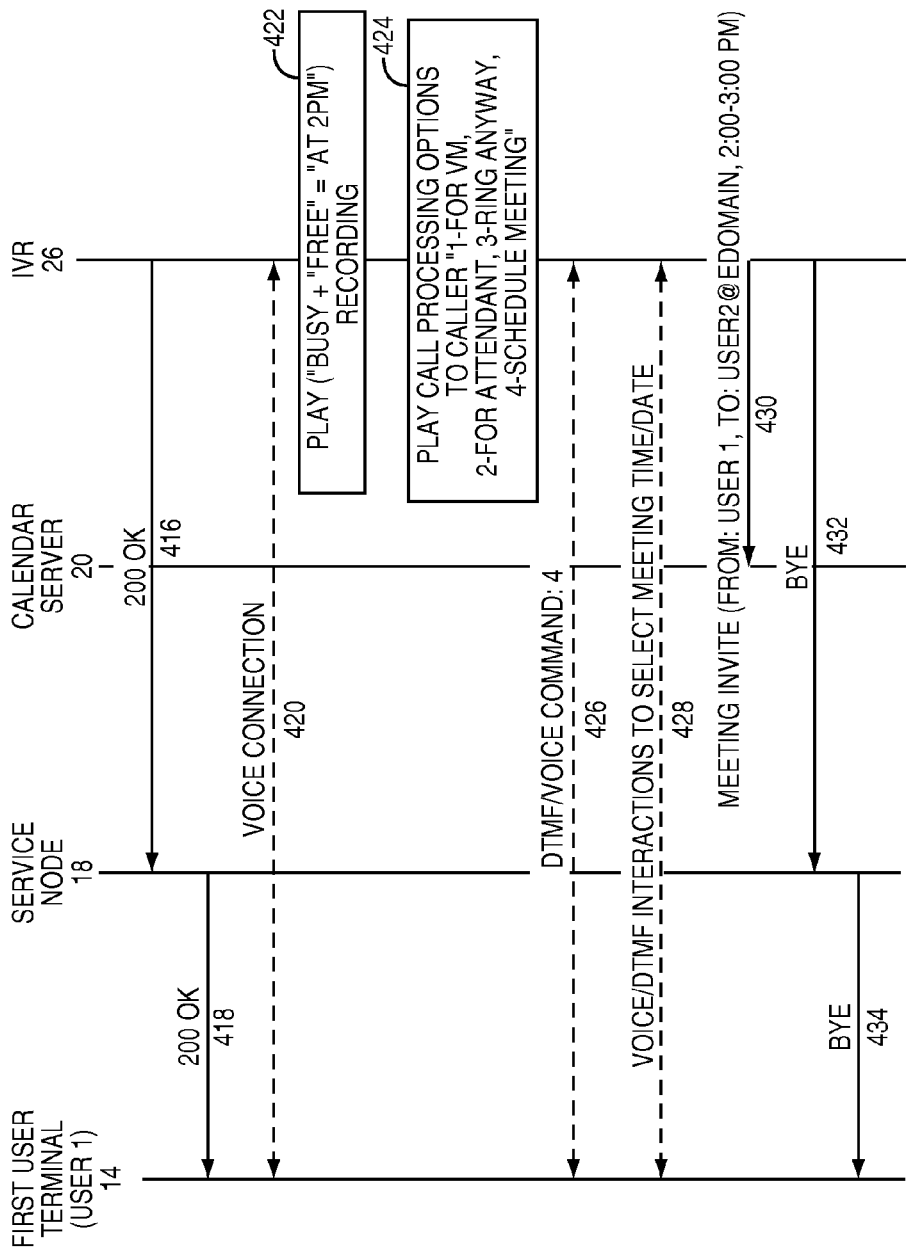

Turning now to FIGS. 5A and 5B, a communication flow is provided for a scenario where the calendar information indicates that the User 2 is busy and unavailable for a call. The calendar information also identifies a subsequent time at which the User 2 is available for a call. The call processing rules again invoke the IVR 26, which will provide a message indicating that User 2 is currently busy, but will be free at a subsequent time, and will present call processing options to the caller. The caller may respond, wherein the IVR 26 will interact with the calendar server to schedule a meeting in the electronic calendar of User 2 on behalf of User 1. When User 1 initiates a call toward User 2, the first user terminal 14 will send an Invite message to the service node 18 (step 400). The service node 18 will identify the calendar address for the called party (step 402) and send a query for calendar information to the calendar server 20 (step 404). The calendar server 20 will obtain the calendar information for User 2 based on the calendar address (step 406) and provide the calendar information back to the service node 18 (step 408). As illustrated, the calendar information indicates that User 2 is currently busy, but will be available after 2:00 p.m. As such, the calendar information relates to the current calendar entry corresponding to the time at which the incoming call is being received, and future calendar information, which may include entry information or an indication of a lack thereof.

In this embodiment, the service node 18 is configured to determine whether or not the calendar service is authorized for calls from User 1. In this example, the service node 18 will obtain permission information for User 2 from an internal or external database and determine if User 1 is authorized to benefit from the calendar service (step 410). These rules may be provided in the called party profile. Assuming User 1 is authorized for the calendar service for User 2, the service node 18 will process the call based on the calendar information (step 412). In this example, the call processing is configured to invoke the IVR 26 when the user is busy, as well as provide instructions to provide a message based on the calendar information to the caller. As such, the service node 18 will send an Invite message to the IVR 26 to effectively route the call to the IVR 26 (step 414). The Invite message will include instructions to provide a message that the User 2 is busy and free at 2:00 p.m. The IVR 26 will send a 200 OK message toward the service node 18 (step 416), which will send the 200 OK message toward the first user terminal 14 (step 418) to establish a voice connection between the first user terminal 14 and the IVR 26 (step 420). Based on the instructions provided by the service node 18, the IVR 26 will play a recording for the caller over the voice connection (step 422). As illustrated, the recording will state that User 2 is busy and will be free at 2:00 p.m.

The instructions provided to the IVR 26 may also result in the IVR 26 providing various available call processing options to the caller over the voice connection (step 324). As illustrated, the IVR 26 will play the following message for the caller: "Press 1 for voicemail, 2 for attendant, 3 ring anyway, and 4 to schedule a meeting." With the first three options, the IVR 26 would return call processing back to the service node 18 with instructions to route the call accordingly. As such, the IVR 26 can receive instructions bearing on call routing from the caller and provide information bearing on these instructions to the service node 18, which will route the call based on the instructions.

In this example, assume that the caller responds with a DTMF or voice command corresponding to the fourth selection (step 426). In light of the caller's response, the IVR 26 may interact with the caller over the voice connection to select a time and date for a meeting, as well as provide text for the calendar entry, attendees, length of the meeting, and the like (step 428). The IVR 26 may recognize that there is an available time for the meeting based on the information provided by the service node 18 (available after 2:00 p.m.), or may retrieve information from the calendar server 20 during the interaction with the caller. Alternatively, the IVR 26 may interact with the service node 18, which will obtain additional calendar information from the calendar server 20 to indicate available meeting times. This interaction may be used to change existing meetings and the like. As a further refinement, the IVR 26 may also interact with the ENUM database 28 to retrieve the calendar address for User 1 and retrieve his calendar data from the calendar server 20, in order to find a timeslot which is free for both User 1 and User 2.

Once the caller and IVR 26 interaction is complete and the IVR 26 has all the information necessary for scheduling or modifying the calendar appointment, the IVR 26 may send a Meeting Invite directly to the calendar server 20 for the meeting scheduled by the caller (step 430). The Meeting Invite may indicate that the meeting Invite message was originated from User 1 and directed to User 2. As illustrated, the meeting is scheduled between User 1 and User 2 for the time period between 2:00 and 3:00 p.m. Once the interaction with the caller is complete, the IVR 26 may send a Bye message to end the IVR 26 session to the service node 18 (step 432), which will send the Bye message toward the first user terminal 14 (step 434). At this point, the voice connection is released.

Those skilled in the art will recognize various possible calendar manipulations, entries, and the like. Through a voice connection, the IVR 26 will allow the caller to manipulate the called party's calendar information through DTMF or voice commands. In any of these embodiments, the call processing rules provided by the service node 18 may take into consideration the calendar information provided by the calendar server 20, as well as any other traditional information to provide a flexible and effective call processing system, which may selectively process calls intended for a called party based on calendar information associated with the called party.

Figure 6:
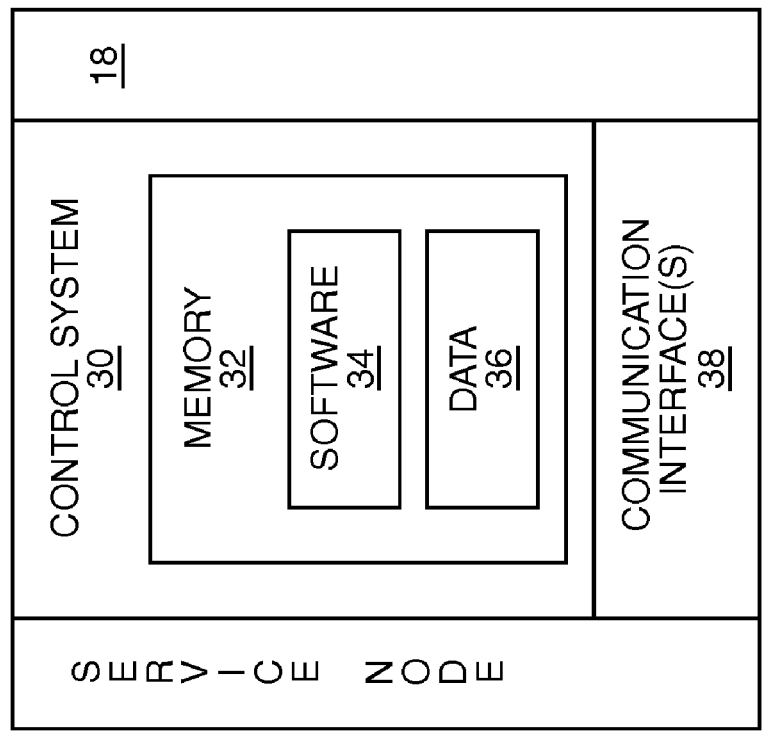
FIG. 6 is a block representation of a service node according to one embodiment of the present invention.

With reference to FIG. 6, a block representation of a service node 18 is illustrated. The service node 18 may include a control system 30 having sufficient memory 32 for the requisite software 34 and data 36 to operate as described above. The control system 30 is associated with one or more communication interfaces 38 to facilitate communications with various entities associated directly or indirectly with the communication network 12.

Figure 7:
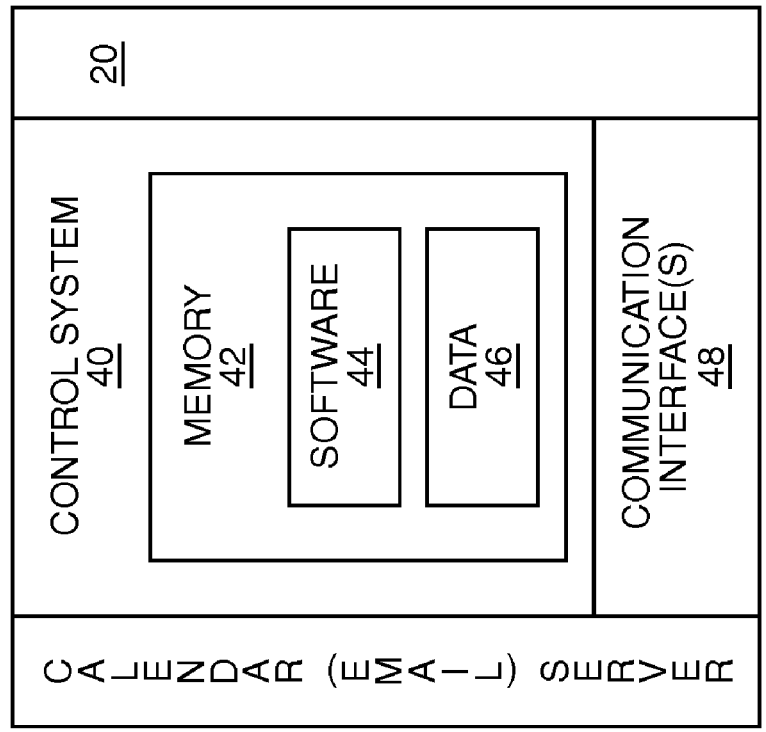
FIG. 7 is a block representation of a calendar (email) server according to one embodiment of the present invention.

With reference to FIG. 7, a block representation of the calendar (email) server 20 is illustrated. The calendar (email) server 20 may include a control system 40 having sufficient memory 42 for the requisite software 44 and data 46 to operate as described above. The control system 40 is associated with one or more communication interfaces 48 to facilitate communications with various entities associated directly or indirectly with the communication network 12.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   receiving a call intended for a called party at a service node comprising: a memory, and a calendar service configured to provide calendar information for the called party;
   determining from per-caller permissions of a called party profile associated with the called party whether a caller initiating the call is authorized for the calendar service;
   if the caller is authorized for the calendar service, processing the call based on the called party calendar information corresponding to at least one of the time of the call and the date of the call; and
   if the caller is not authorized for the calendar service, attempting to connect the call to the called party not based on the called party calendar information.

2. The method of claim 1, wherein the processing the call comprises forwarding the call toward a voicemail system for the called party based on the called party calendar information.

3. The method of claim 2, wherein the call is forwarded to the voicemail system without presenting the call to a terminal associated with the called party.

4. The method of claim 1, wherein the processing the call comprises forwarding the call to and providing instructions based on the called party calendar information to an interactive voice response system, which will establish the call with the caller who initiated the call.

5. The method of claim 4, wherein the instructions are for providing an audible announcement based on the called party calendar information to the caller.

6. The method of claim 5, wherein the audible announcement relates to a current status of the called party based on the called party calendar information.

7. The method of claim 5, wherein the audible announcement relates to a future status of the called party based on the called party calendar information.

8. The method of claim 7, wherein the audible announcement identifies a time at which the called party is available for communications based on the called party calendar information.

9. The method of claim 4, wherein the instructions are for providing a plurality of call processing options based on the called party calendar information to the caller, and receiving a selected one of the plurality of call processing options from the caller, the method further comprising:
   receiving the selected one of the plurality of call processing options; and
   further processing the call based on the selected one of the plurality of call processing options.

10. The method of claim 4, wherein the instructions are for facilitating scheduling of an appointment in an electronic calendar of the called party by the caller via the interactive voice response system.

11. The method of claim 1, further comprising:
    identifying a telephony address or directory number to which the call is directed and associated with the called party; and
    obtaining a calendar address for the called party based on the telephony address or directory number, wherein the called party calendar information is retrieved from an electronic calendar using the calendar address.

12. The method of claim 1, further comprising retrieving the called party calendar information if the caller is authorized for the calendar service.

13. The method of claim 1, further comprising retrieving the called party calendar information after the receiving the call and before the determining whether the caller initiating the call is authorized for the calendar service.

14. The method of claim 1, further comprising making available the called party calendar information to the caller initiating the call.

15. A system comprising:
    at least one communication interface; and
    a control system associated with the at least one communication interface and comprising a calendar service configured to provide calendar information for the called party, wherein the control system is configured to:
       receive a call intended for a called party;
       determine from per-caller permissions of a called party profile associated with the called party whether a caller initiating the call is authorized for the calendar service;
       process the call based on the called party calendar information corresponding to at least one of the time of the call and the date of the call if the caller is authorized for the calendar service; and
       attempt to connect the call to the called party not based on the called party calendar information if the caller is not authorized for the calendar service.

16. The system of claim 15, wherein to process the call, the control system is configured to forward the call toward a voicemail system for the called party based on the called party calendar information.

17. The system of claim 16, wherein the call is forwarded to the voicemail system without presenting the call to a terminal associated with the called party.

18. The system of claim 15, wherein to process the call, the control system is further configured to forward the call to and provide instructions based on the called party calendar information to an interactive voice response system, which will establish the call with the caller who initiated the call.

19. The system of claim 18, wherein the instructions are for providing an audible announcement based on the called party calendar information to the caller.

20. The system of claim 19, wherein the audible announcement relates to a current status of the called party based on the called party calendar information.

21. The system of claim 19, wherein the audible announcement relates to a future status of the called party based on the called party calendar information.

22. The system of claim 21, wherein the audible announcement identifies a time at which the called party is available for communications based on the called party calendar information.

23. The system of claim 18, wherein the instructions are for providing a plurality of call processing options based on the called party calendar information to the caller and receiving a selected one of the plurality of call processing options from the caller, the control system further configured to:
    receive the selected one of the plurality of call processing options; and
    further process the call based on the selected one of the plurality of call processing options.

24. The system of claim 18, wherein the instructions are for facilitating scheduling of an appointment in an electronic calendar of the called party by the caller via the interactive voice response system.

25. The system of claim 15, wherein the control system is further configured to:
    identify a telephony address or directory number to which the call is directed and associated with the called party; and obtain a calendar address for the called party based on the telephony address or directory number, wherein the called party calendar information is retrieved from an electronic calendar using the calendar address.

26. The system of claim 15, wherein the control system is further configured to retrieve the called party calendar information if the caller is authorized for the calendar service.

27. The system of claim 15, wherein the control system is further configured to retrieve the called party calendar information after the receiving the call and before the determining whether the caller initiating the call is authorized for the calendar service.

28. The system of claim 15, wherein the control system is further configured to make available the called party calendar information to the caller initiating the call.

29. An apparatus, comprising:
a control system configured to:
receive an INVITE intended for a called party;
query an ENUM database for at least one calendar address associated with the called party upon receiving the INVITE intended for the called party;
receive a response from the ENUM database responsive to the query;
based upon the response from the ENUM database, query a calendar server for calendar information associated with the called party;
receive a response from the calendar server comprising the calendar information associated with the called party; and
further process the INVITE based upon the received calendar information associated with the called party, wherein to further process the INVITE, the control system is further configured to transmit a second INVITE comprising at least one X-IVR-MSG header.

30. The apparatus of claim 29, wherein the response from the ENUM database comprises at least one calendar address identifying at least one location of the calendar information associated with the called party.

31. The apparatus of claim 30, wherein the at least one calendar address identifying the at least one location of the calendar information associated with the called party comprises a user portion and a domain portion.

32. The apparatus of claim 29, wherein the control system is further configured to transmit the second INVITE comprising the at least one X-IVR-MSG header towards an interactive voice response system.

* * * * *